United States Patent
Bezold et al.

(10) Patent No.: US 11,788,629 B2
(45) Date of Patent: Oct. 17, 2023

(54) METHOD OF MANUFACTURING A VALVE ARMATURE OF A SOLENOID VALVE, VALVE ARMATURE AND SOLENOID VALVE

(71) Applicant: Buerkert Werke GmbH & Co. KG, Ingelfingen (DE)

(72) Inventors: Christian Bezold, Ingelfingen (DE); Dieter Schmieg, Ingelfingen (DE); Tobias Griebel, Forchtenberg - Ernsbach (DE); Rainer Hofmann, Forchtenberg - Ernsbach (DE)

(73) Assignee: BÜRKERT WERKE GMBH & CO. KG, Ingelfingen (DE)

( * ) Notice: Subject to any disclaimer, the term of this patent is extended or adjusted under 35 U.S.C. 154(b) by 65 days.

(21) Appl. No.: 17/540,134

(22) Filed: Dec. 1, 2021

(65) Prior Publication Data
US 2022/0178450 A1 Jun. 9, 2022

(30) Foreign Application Priority Data
Dec. 3, 2020 (DE) ...................... 10 2020 132 192.9

(51) Int. Cl.
| | |
|---|---|
| *F16K 1/36* | (2006.01) |
| *F16K 1/46* | (2006.01) |
| *F16J 15/3204* | (2016.01) |
| *F16K 31/06* | (2006.01) |

(52) U.S. Cl.
CPC ............ *F16K 1/46* (2013.01); *F16J 15/3204* (2013.01); *F16K 1/36* (2013.01); *F16K 31/0658* (2013.01)

(58) Field of Classification Search
CPC ...... F16K 1/34; F16K 1/36; F16K 1/42; F16K 1/46; F16K 25/005; F16K 31/0658; F16K 31/0655; F16K 31/06; B21D 51/10; B21D 53/10; F16J 15/3204; F16J 15/106; F16J 15/108; F16J 15/062
See application file for complete search history.

(56) References Cited

U.S. PATENT DOCUMENTS

| | | | |
|---|---|---|---|
| 3,140,073 A | 7/1964 | Finck, Jr. | |
| 3,301,524 A * | 1/1967 | Otto .......................... | F16K 1/46 251/175 |
| 3,670,274 A * | 6/1972 | Ellison ................ | F16K 31/0627 335/278 |
| 3,814,040 A * | 6/1974 | Habash .................. | B21D 22/02 72/348 |
| 4,535,519 A * | 8/1985 | Kajikawa ............... | B21K 21/00 29/890.132 |
| 6,003,839 A * | 12/1999 | Kobayashi ......... | F02M 25/0836 251/129.15 |
| 7,369,023 B2 * | 5/2008 | Frank .................. | F16K 31/0658 335/279 |

(Continued)

FOREIGN PATENT DOCUMENTS

| | | |
|---|---|---|
| DE | 10113316 A1 | 9/2002 |
| WO | 8704850 A1 | 8/1987 |

*Primary Examiner* — Matthew W Jellett
(74) *Attorney, Agent, or Firm* — DILWORTH IP, LLC (57) ABSTRACT

A valve armature of a solenoid valve includes an armature body having a blind hole in which an elastomer seal is vulcanized in. The armature body is manufactured in a cold forming process, in which a final axial linear dimension of the armature body is also determined. Furthermore, a valve having such a valve armature is presented.

14 Claims, 4 Drawing Sheets

(56) References Cited

U.S. PATENT DOCUMENTS

| | | | |
|---|---|---|---|
| 7,941,922 B2* | 5/2011 | Stark | F01L 3/20 |
| | | | 29/888.45 |
| 8,261,424 B1* | 9/2012 | Thomeczek | B23P 11/00 |
| | | | 29/520 |
| 9,636,741 B2* | 5/2017 | Mehta | B21K 1/24 |
| 11,311,980 B2* | 4/2022 | Studt | F16K 1/36 |
| 2002/0135451 A1 | 9/2002 | Frank et al. | |
| 2013/0032742 A1* | 2/2013 | Scherer | H01F 7/13 |
| | | | 29/602.1 |

\* cited by examiner

METHOD OF MANUFACTURING A VALVE ARMATURE OF A SOLENOID VALVE, VALVE ARMATURE AND SOLENOID VALVE

FIELD OF THE INVENTION

The invention relates to a method of manufacturing a valve armature of a solenoid valve, a valve armature and a solenoid valve.

BACKGROUND

Solenoid valves, in particular plunger valves, are known which are provided with a valve armature that is moved linearly by means of a drive and includes an elastomer seal at one end, the elastomer seal cooperating with a valve seat to permit or interrupt a fluid flow.

Valve armatures of this type are often manufactured in a metal cutting process.

The object of the invention is to accelerate the manufacturing process of a valve armature for a solenoid valve and to reduce production costs.

SUMMARY

The present invention provides a method of manufacturing a valve armature of a solenoid valve, including an armature body and an elastomer seal fastened thereto, including the following steps. A cylinder-shaped blank is reshaped to a final axial linear dimension of the armature body in a cold forming process, a blind hole being produced at one end of the blank and a valve seat-side end face being produced that surrounds the blind hole. An elastomer seal is vulcanized in on an inner circumferential surface of the blind hole.

Vulcanizing-in is understood to mean that the elastomer material of the elastomer seal is vulcanized in its final position in the component, that is, in this case, in the armature body, with cross-linking and curing of the elastomer material taking place.

In the process, the tool may be heated so that the thermal energy transferred from the tool to the blank assists the vulcanization process.

It has been found that the method according to the invention allows a reduction in manufacturing time by a factor of up to 10 to be achieved, in particular for small dimensions of the valve armature in the range of a few millimeters to a few centimeters.

The valve lift of the finished solenoid valve may be about 0.4 mm here, for example.

The blank is, for example, a solid cylinder, in particular a circular cylinder, having dimensions of about 8 mm by 20 mm, i.e. a cylinder without an initial through hole.

The material used may be a magnetic metal, for example stainless steel 1.4113.

The armature body can be a single piece, so that the entire valve armature consists of only two components, namely the armature body and the elastomer seal.

Normally, other than the cold forming steps and the insertion, if necessary a shaping, and vulcanizing the elastomer seal in place, no further processing steps are required for finishing the valve armature.

The blank can be upset along the longitudinal direction of the valve armature during the cold forming process, a length of the armature body being adjusted to the predefined final linear dimension. In this process, it is possible to meet tolerances of about 0.15 mm. There is no final metal-cutting or material removal process for length adjustment.

Upsetting may be performed over several reshaping or forming steps or in one single reshaping or forming step at any suitable point in time during the cold forming process. For example, it may be the penultimate or the last forming step.

Adhesion of the elastomer seal in the blind hole of the armature body may be increased in that a projection defining an undercut is produced on the inner circumferential surface of the blind hole during forming. The elastomer seal then extends on both sides of this projection in the axial direction, so that the projection can reliably prevent movement of the elastomer seal in the axial direction. In particular, it is not necessary to introduce an adhesive agent between the inner circumferential surface and the elastomer seal, which further reduces the production time.

For example, the blind hole may be designed such that about one third of the elastomer material filling the blind hole is located in the undercut.

In terms of production engineering, it is favorable if the projection extends circumferentially all around.

In this context, the terms axial direction, circumferential direction and radial direction always refer to a longitudinal direction of the valve armature.

For producing the undercut, in a first step, for example, a material section of the blind hole adjacent to the inner circumferential surface is spaced apart from a section on the end face radially adjacent thereto on the outside by producing a groove by a first tool that is adapted to be linearly traversed in the axial direction. In a second step, the material section is deformed radially inwards and at the same time axially towards a bottom of the blind hole by means of a second tool that is adapted to be linearly traversed in the axial direction, so that the projection is created, the projection extending all around circumferentially and protruding radially inwards. The material section is, as it were, folded over radially inward toward the bottom of the blind hole by the second tool.

During the forming operation, the second tool may rest against the inner circumferential surface of the blind hole, in particular against a radially inner surface of the projection, to define the shape and dimensions of the blind hole in this region.

The second tool may include a section located radially within the projection and protruding axially into the blind hole and participating in the shaping of the projection. While the second tool is traversed, an edge on a radial tip of the projection is rounded and, as it were, deburred by the second tool.

The radial tip of the projection normally constitutes the smallest diameter region of the blind hole.

The section of the second tool that protrudes into the blind hole transitions into a neighboring section, preferably in a rounded fashion, so that the projection is given a rounded edge at its radial tip in the transition between the blind hole and an end face section directly surrounding the blind hole. In the area of a minimum diameter of the blind hole and, accordingly, the maximum radial extent of the projection, a rounded edge can in this way prevent high forces on the elastomer seal.

The projection is, in particular, axially spaced apart from the axial end of the inner circumferential surface of the blind hole.

The elastomer seal may have a disk-like section in front of the projection in the axial direction, this section projecting laterally beyond the blind hole in the area of the projection and forming the face side end of the elastomer seal. In this way, the form-fitting, clearance-free mounting of the elastomer seal in the blind hole is improved. The elastomer seal here rests on the end wall section immediately surrounding the blind hole.

When the valve is in the closed position, only the disk-like section of the elastomer seal rests against the valve seat. Preferably, however, the valve seat-side end of the disk-like section is axially at the same level as the valve seat-side end face. The latter, however, is spaced radially further from the valve seat than the disk-like section.

To accommodate the disk-like section, the end face of the valve body is depressed in an annular shape in the end face section extending directly around the blind hole.

The elastomer seal is introduced into the blind hole by the following steps, for example. For vulcanizing-in of the elastomer seal, the armature body and an elastomer material are heated. The elastomer material is portioned and filled into the blind hole, in particular up to axially behind the undercut. A face side section of the elastomer seal is shaped to its final shape, in particular the disk-like section. The elastomer material completely vulcanizes to its final hardness, if required by further application of heat. At the same time, the elastomer seal is fixed in place in the blind hole.

Introduction of the elastomer material may be performed, for example, by injection, transfer molding or compression.

It is possible to provide the elastomer material with a suitable crosslinking agent beforehand, or to select an elastomer material that can be vulcanized purely thermally.

Shaping of the armature body can be fully completed before the elastomer seal is introduced into the blind hole.

It is possible to produce lateral flattened portions, which extend parallel to the longitudinal axis of the valve armature, on a circumferential shell surface of the armature body during the cold forming process, which enhance the routing of air flow around the valve armature.

In addition, in one of the cold forming steps, a lateral collar may be shaped on the face side associated with the blind hole, that is, the valve seat-side face side of the armature body. This lateral collar can be used to provide a contact surface for a compression spring that biases the valve armature to an initial state.

A complete process of manufacturing the valve armature may, for example, proceed in such a way that first the blind hole and, if applicable, the lateral flattened portions as well as the lateral collar are incorporated into the circular cylindrical blank by means of one or more cold forming steps. Then, in a further cold forming step, the material section for the projection is divided off, which is formed into the radial projection in yet another cold forming step. In one or more of these cold forming steps or else in a separate cold forming step, the armature body is upset to its final linear dimension. Finally, the elastomer material of the elastomer seal is introduced and the disk-like section of the elastomer seal is molded. Further manufacturing steps besides those described, in particular a finishing of the blind hole or of surfaces of the armature body, may be dispensed with.

A valve armature of a solenoid valve that has been manufactured in particular according to a method described above has a blind hole at a valve seat-side end, the blind hole having an elastomer seal vulcanized into it. In this way, the elastomer seal is securely fixed in an armature body, having the blind hole, of the valve armature, which results in an improved stability during operation of the solenoid valve at higher temperatures, for example.

The valve seat cooperates with the valve seat-side face side to close the valve in its closed position and to interrupt a flow of fluid.

Formed on the inner circumferential surface of the blind hole is, in particular, a projection protruding radially inwards, behind which an undercut is formed axially into the blind hole and which fixes the elastomer seal in place.

The projection may be arranged to be axially spaced apart from the valve seat-side end face of the valve armature.

Lateral flattened portions may be provided on the circumferential shell surface of a stem of the valve armature, which extend parallel to the longitudinal axis of the valve armature and serve to improve a routing of air flow around the valve armature.

In a solenoid valve including a valve armature as described above and a valve body having a valve seat, the elastomer seal is located opposite the valve seat and can make sealing contact therewith when the solenoid valve is in its closed position.

The valve armature may include a radial collar on its valve seat-side face side, which usually corresponds to the valve seat-side end face of the armature body of the valve armature, a compression spring resting against the radial collar and biasing the valve armature to an initial state. This initial state may be either the open position or the closed position.

A projection that defines an undercut is provided on the inner circumferential surface of the blind hole, and, in the axial direction, the valve seat is located radially within the cross-section defined by the projection. With this geometry, a pressure is applied to the elastomer seal, which is fixed in position in the blind hole, in the region radially inward of the projection, resulting in a better fit of the elastomer seal within the blind hole and in a more uniform deformation of the elastomer seal during closing of the valve.

The use of a cold forming process to manufacture an armature body of a valve armature and the vulcanizing-in of an elastomer seal in a blind hole of the armature body allow the valve armature to be manufactured rapidly and with high precision. In particular, the final linear dimension of the valve armature can be achieved with a very small tolerance by upsetting during cold forming. In addition, it is possible to fix the elastomer seal in position in the blind hole during the vulcanizing-in process by means of an undercut also produced during cold forming.

BRIEF DESCRIPTION OF THE DRAWINGS

FIG. 8 shows a schematic sectional view of the valve armature according to the invention before the elastomer seal is vulcanized in.

DETAILED DESCRIPTION

Figure 1:
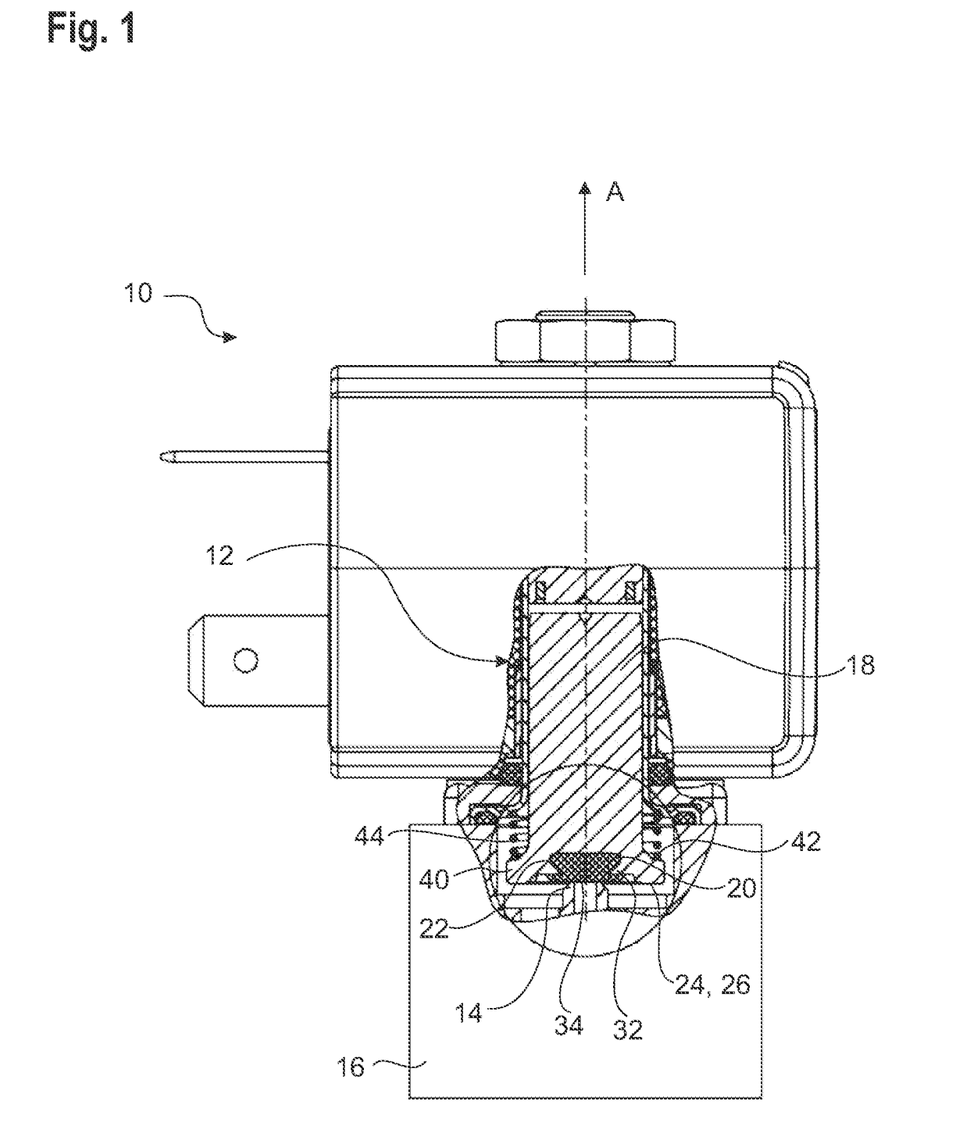
FIG. 1 shows a schematic partly sectional view of a solenoid valve according to the invention with a valve armature according to the invention, manufactured in accordance with a method according to the invention.

FIG. 1 shows a solenoid valve 10, in particular a plunger valve, which comprises a valve armature 12 that is linearly movable along an axial direction A and is adapted to be moved between an open position and a closed position by means of a known solenoid actuator not shown in more detail.

In the open position, which also corresponds to an open position of the solenoid valve 10, the valve armature 12 is lifted off a valve seat 14 of a valve body 16, whereas in the closed position, which also corresponds to a closed position of the solenoid valve 10, the valve armature 12 rests on the valve seat 14.

The axial direction A corresponds to the longitudinal direction of the valve armature 12 and will be equated with it in the following.

Here, the valve armature 12 consists of a rigid armature body 18 and an elastomer seal 20 that is firmly and permanently fixed to the armature body 18.

In the closed position, the elastomer seal 20 is in sealing contact with the valve seat 14 and interrupts a flow of fluid through the solenoid valve 10.

The armature body 18 has a blind hole 22 formed therein, which is surrounded radially by an annular valve seat-side end face 26 on a face side 24 at the valve seat-side end of the armature body 18. The blind hole 22 has a bottom 28 axially recessed into the interior of the armature body 18.

Figure 2:
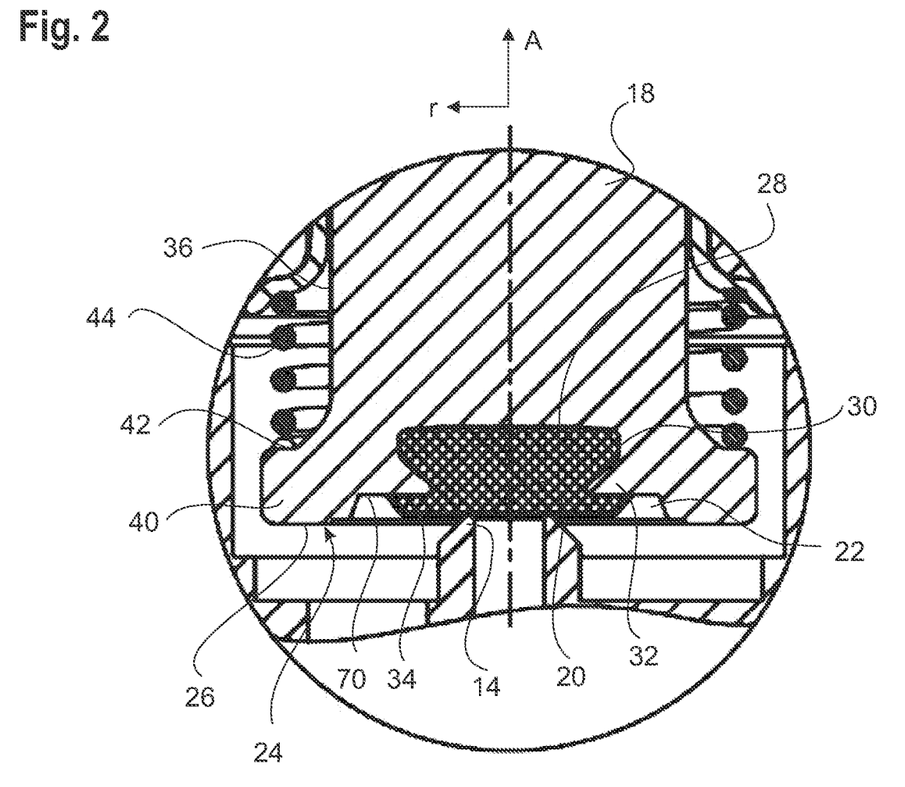
FIG. 2 shows a detail view from FIG. 1.

The elastomer seal 20 is vulcanized-in the blind hole 22, thereby adhering to an inner circumferential surface 30 of the blind hole 22 (see, e.g., FIG. 2).

In the example shown, the elastomer seal 20 fills the blind hole 22 up to the bottom 28.

A circumferentially encircling projection 32 is provided, which is recessed in relation to the end face 26 in the axial direction A towards the bottom 28 of the blind hole 22. The projection 32 protrudes radially from the inner circumferential surface 30 into the interior of the blind hole 22, in this way forming an undercut axially into the blind hole 22. The elastomer seal 20 extends axially on either side of the projection 32, so that the projection 32 additionally fixes the elastomer seal 20 in place.

The projection 32 is axially spaced apart from the end face 26 of the armature body 18, the end face 26 being annularly depressed in an end face section 70 directly around the blind hole 22.

A disk-like section 34 is formed on the elastomer seal 20 at the valve seat-side end and protrudes beyond the projection 32 and also beyond the valve seat 14 in the radial direction r. Thus, when viewed axially, the valve seat 14 is located radially within the cross-section formed by the projection 32.

The disk-like section 34 constitutes the face side end of the elastomer seal 20.

Figure 3:
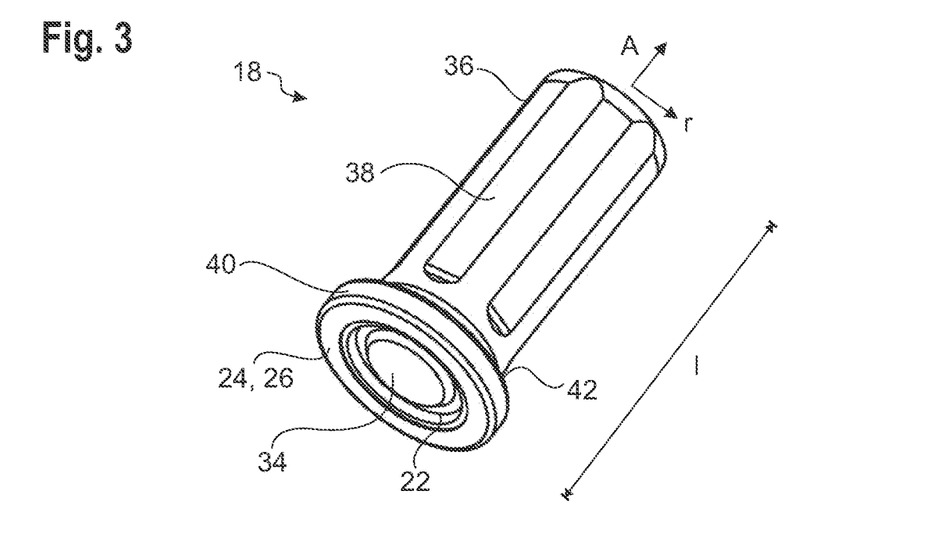
FIG. 3 shows a schematic perspective illustration of a valve armature according to the invention.

In this example, a plurality of flattened portions 38 are provided on a circumferential shell surface 35 of a stem 36 of the armature body 18 (see FIG. 3), the flattened portions extending along the axial direction A and thus parallel to the longitudinal axis of the valve armature 12. These flattened portions 38 serve to improve the air flow around the valve armature 12.

Furthermore, on its face side 24, the armature body 18 here includes a radial collar 40 which continues into the end face 26 on the valve seat side and forms a contact surface 42 for a compression spring 44 on the circumferential shell surface 35 on a side opposite the end face 26 (see FIGS. 1 and 2).

Figure 4:
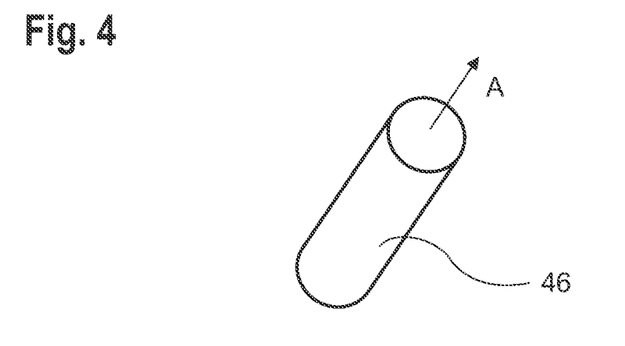
FIG. 4 shows a schematic perspective illustration of a blank for an armature body of the valve armature from FIG. 3.

To manufacture the valve armature 12, first a blank 46 schematically depicted in FIG. 4 and made of a suitable magnetic metal, for example stainless steel 1.4113, is reshaped in a cold forming process comprising several steps.

In general, the order of the individual reshaping or forming steps is at the discretion of a person of ordinary skill in the art.

In this example, the blank 46 is circular cylindrical in the form of a solid body. However, it could of course also have any other suitable shape.

The blind hole 22, the flattened portions 38 and the radial collar 40 are produced on the blank 46 in one or more forming or reshaping steps (not illustrated).

Figure 5:
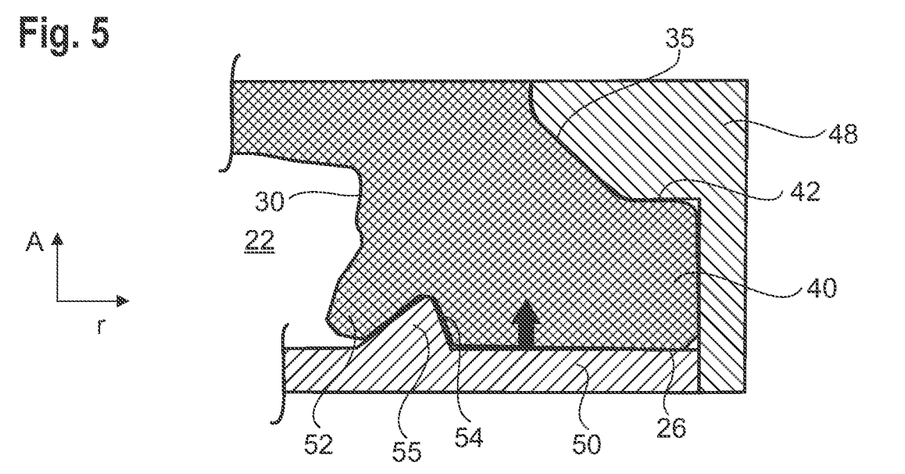
FIGS. 5 and 6 show a schematic illustration of tools and forming steps of the method according to the invention.
Figure 6:
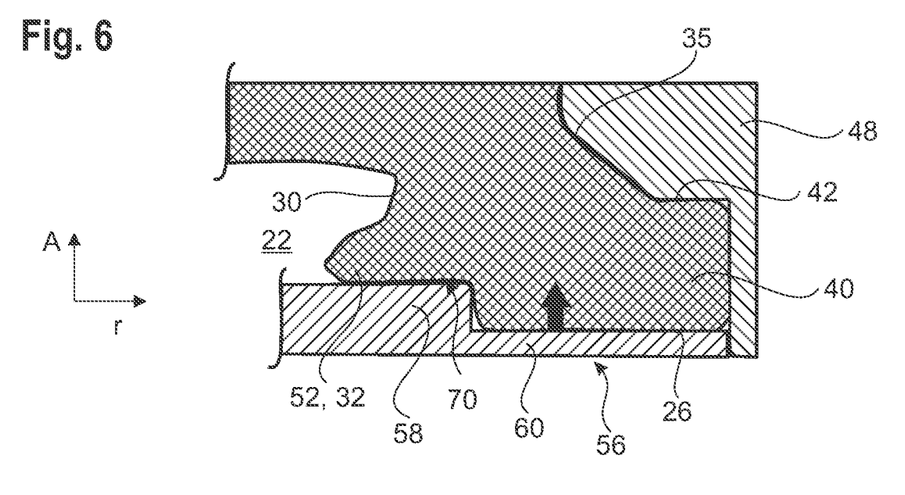

After producing the blind hole 22, two further forming steps are carried out, which are illustrated in FIGS. 5 and 6 and in which the projection 32 constituting the undercut in the blind hole 22 is created.

At that time, the blank 46 is accommodated in an outer tool 48, which was previously used here for shaping the circumferential shell surface 35 and for producing the radial collar 40. This outer tool 48 supports the circumferential shell surface 35 and prevents the material of the blank 46 from spreading in the radial direction r beyond the circumferential shell surface 35, which has already been shaped.

In a first step, which is illustrated in FIG. 5, a first tool 50 that is adapted to be linearly traversed in the axial direction A is used to space apart and partly sever a material section 52 on the end face 26 from a radially outwardly adjacent section of the end face 26 by generating a groove 54 by means of traversing the first tool 50 toward the bottom 28 of the blind hole 22. To this end, the first tool 50 includes an axially directed wedge-shaped section 55, which is pressed into the end face 26 to produce the groove 54.

In a second step, which is illustrated in FIG. 6, the first tool 50 is replaced by a second tool 56 which is also adapted to be linearly traversed in the axial direction A, and the second tool 56 is used to deform the material section 52 radially inwards and at the same time axially towards the bottom 28 of the blind hole 22, so that the projection 32 is produced.

The material section 52 is folded over, as it were, in the axial direction A, with the groove 54 being flattened or completely eliminated by the second tool 56. For this purpose, the second tool 56 includes a stepped section 58, which protrudes axially beyond a section 60 resting flat against the face side 24. The surfaces of both the section 58 and the section 60 that face the blank 46 are oriented to be perpendicular to the axial direction A.

The valve seat-side end face 26 is also obtained in this work step. The annular, recessed end face section 70 is produced by the folding over of the material.

The projection 32 protrudes radially inward and extends circumferentially all around.

Due to the travel distance of the second tool 56 in the axial direction A, the projection 32 is spaced apart from the end face 26.

The direction of movement of the first and second tools 50, 56 is marked by arrows in FIGS. 5 and 6.

Figure 7:
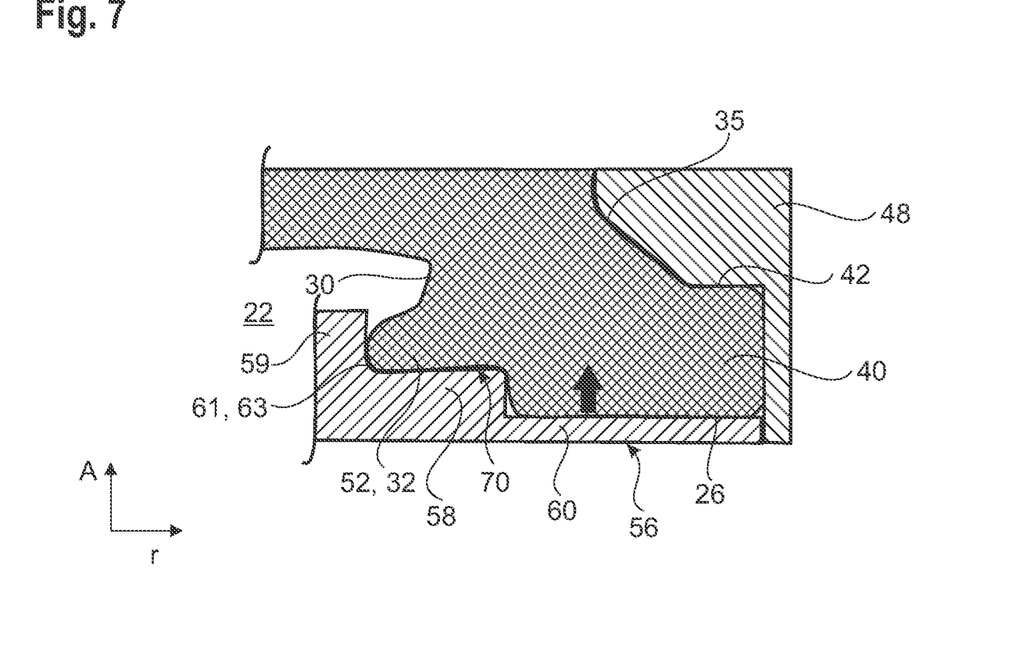
FIG. 7 shows a variant of the tool and the forming step from FIG. 6.

FIG. 7 shows a variant of the second tool 56'. Here, the section 58 is adjoined radially on the inside by a further section 59, the shape of which corresponds to the desired inner cross-section of the projection 32.

The section 59 projects axially beyond the section 58 and protrudes a little further into the blind hole 22 than the desired axial length of the projection 32.

Figure 8:
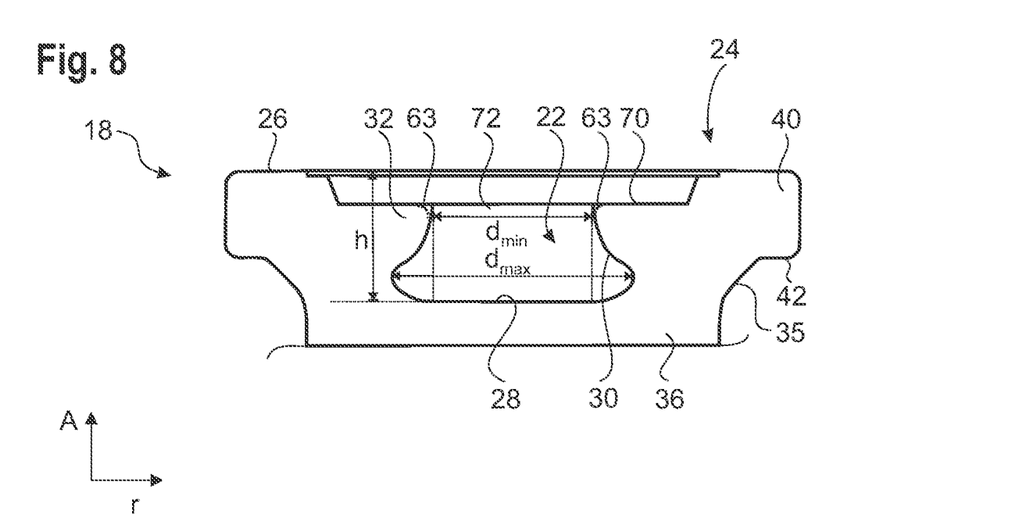

The transition 61 from the section 59 to the section 58 has a rounded shape with a suitable radius, so that the transition from the end face section 70 to the projection 32, that is, the region of a radial tip 63 of the projection 32 which defines the minimum diameter of an opening 72 to the blind hole 22, is given a rounded edge (see also in dashed lines in FIG. 8).

For this, the radius should be selected to be sufficiently large to prevent undesirably high shear forces on the elastomer seal 20.

After these steps, a final reshaping or forming step is effected here in which the blank 46 is upset along the axial direction A to a final axial linear dimension I which is specified for the armature body 18. In this step, the end face 26 is also given its final shape.

In this example, this upsetting step completes the shaping of the armature body 18.

The upsetting step could also be performed at some other point in time during cold forming. It is also possible to distribute the upsetting to a plurality of forming steps, in particular to forming steps in which a shaping process is carried out on other sections of the blank 46.

FIG. 8 shows an example of the completed blind hole 22.

Here, the undercut created by the projection 32 is configured such that about one-third of the volume of the blind hole 22, and therefore also one-third of the elastomer material filling the blind hole 22, is located in the undercut.

The cross-sectional area of the blind hole 22 and, if applicable, of the section 59 of the tool 56' are selected to be circular here. However, other cross-sectional shapes are also conceivable.

Possible dimensions of the blind hole 22 are a minimum diameter $d_{min}$ of 3.0-3.4 mm, in particular 3.2 mm, at the opening 72 in the end face section 70, a maximum diameter $d_{max}$ of 4.5-5.0 mm, in particular 4.7 mm, which is reached here just above the bottom 28 of the blind hole 22, with a depth h of the blind hole 22 of about 2.0-2.7 mm, in particular 2.6 mm, from the end face 26 to the bottom 28.

This results in an area ratio of 4.6 for the area at the opening 72 to the end face section 70 compared to the annular area in the undercut (as illustrated by the dashed lines in FIG. 8), or an area ratio between the minimum and maximum areas of between 0.44 and 0.46.

Here, the elastomer seal 20 is vulcanized in place by the following steps. The armature body 18 is heated, which can be effected, for example, by a heatable tool, such as the outer tool 48. A suitable elastomer material is portioned and filled into the blind hole 22 up to axially behind the undercut formed by the projection 32.

A valve seat-side section of the elastomer seal 20 is shaped to its final shape, in this case the disk-like section 34. In this example, a distance remains in the radial direction r between the radially outer edge of the disk-like section 34 and the section of the inner circumferential surface 30 of the blind hole 22 adjacent to the valve seat-side end face 26 (see FIGS. 2 and 3).

The heatable tool supplies the heat necessary for the vulcanization process, so that the material of the elastomer seal 20 cures to its final hardness while retaining the necessary elasticity.

Since the elastomer seal 20 engages around the projection 32 on both sides in the axial direction A, the elastomer seal 20 is fixed in position in the blind hole 22. It is not required to specially prepare the inner circumferential surface 30 or, for example, to provide it with a bonding agent. The elastomer seal 20 thus extends in particular also over the rounded edge at the tip 63 of the projection 32.

In this example, the face side of the disk-like section 34 of the elastomer seal 20 does not protrude beyond the valve seat-side end face 26 in the axial direction A.

For the effective length, which determines the gap between the valve armature 12 and the valve seat 14, the length from the face side facing away from the valve seat 14 to the front of the elastomer seal 20 is decisive. In this respect, the length of the valve body 16 from the face side facing away from the valve seat 14 to the end face section 70 produced during the forming process is important, the length being set by the upsetting process.

The invention claimed is:

1. A method of manufacturing a valve armature of a solenoid valve, having an armature body and an elastomer seal fastened thereto, comprising steps of:
   reshaping a cylinder-shaped blank to a final axial linear dimension of the armature body in a cold forming process, a blind hole being produced at one end of the cylinder-shaped blank and a valve seat-side end face being produced that surrounds the blind hole; and
   vulcanizing the elastomer seal to an inner circumferential surface of the blind hole, wherein during the cold forming process, the cylinder-shaped blank is upset along a longitudinal direction of the valve armature, a length of the armature body being adjusted to the final linear dimension.

2. The method according to claim 1, wherein a projection defining an undercut is produced on the inner circumferential surface of the blind hole during the cold forming process.

3. A method of manufacturing a valve armature of a solenoid valve, having an armature body and an elastomer seal fastened thereto, comprising steps of:
   reshaping a cylinder-shaped blank to a final axial linear dimension of the armature body in a cold forming process, a blind hole being produced at one end of the cylinder-shaped blank and a valve seat-side end face being produced that surrounds the blind hole; and
   vulcanizing the elastomer seal to an inner circumferential surface of the blind hole, wherein a projection defining an undercut is produced on the inner circumferential surface of the blind hole during the cold forming process,
   wherein for producing the undercut, in a first step a material section adjacent to the inner circumferential surface is spaced apart from a section on an end face radially adjacent thereto on an outside by producing a groove by a first tool that is adapted to be linearly traversed in an axial direction, and in a second step the material section is deformed radially inwards and at a same time axially towards a bottom of the blind hole by means of a second tool that is adapted to be linearly traversed in the axial direction, so that the projection is created, the projection extending all around circumferentially and protruding radially inwards.

4. The method according to claim 3, wherein the second tool includes a section located radially within the projection and protruding axially into the blind hole and participating in a shaping of the projection, and wherein while the second tool is traversed, an edge on a radial tip of the projection is rounded by the second tool.

5. The method according to claim 3, wherein the elastomer seal has a disk-like section in front of the projection in the axial direction, the section projecting laterally beyond the blind hole in an area of the projection and forming a face side end of the elastomer seal.

6. The method according to claim 1, wherein for vulcanizing-in of the elastomer seal, the armature body and an elastomer material are heated, the elastomer material is portioned and filled into the blind hole and a face side section of the elastomer seal is shaped to its final shape, and the elastomer material is completely vulcanized to its final hardness.

7. The method according to claim 1, wherein during cold forming, lateral flattened portions that extend parallel to a longitudinal axis of the valve armature are produced on a circumferential shell surface of the armature body.

8. The method according to claim 1, wherein a lateral collar is shaped on a face side associated with the blind hole by cold forming.

9. A valve armature of a solenoid valve, the valve armature having a valve seat-side end, wherein on the valve seat-side end, the valve armature has a blind hole with an elastomer seal vulcanized into it, wherein formed on an inner circumferential surface of the blind hole is a projection protruding radially inwards, behind which an undercut is formed axially into the blind hole and which fixes the elastomer seal in position, and wherein the elastomer seal has a disk-like section in front of the projection in an axial direction, the disk-like section projecting laterally beyond the projection and forming a face side end of the elastomer seal, a radially outer edge of the disk-like section being distanced in the radial direction from the inner circumferential surface of the blind hole.

10. The valve armature according to claim 9, wherein the projection is arranged to be axially spaced apart from a valve seat-side end face of the valve armature.

11. A solenoid valve comprising a valve armature having a valve seat-side end, wherein on the valve seat-side end, the valve armature has a blind hole with an elastomer seal vulcanized into it, wherein formed on an inner circumferential surface of the blind hole is a projection protruding radially inwards, behind which an undercut is formed axially into the blind hole and which fixes the elastomer seal in position, and comprising a valve body having a valve seat, wherein the elastomer seal is located opposite the valve seat and can sealingly contact it, and wherein the elastomer seal has a disk-like section in front of the projection in an axial direction projecting laterally beyond the projection and forming a face side end of the elastomer seal, a radially outer edge of the disk-like section being distanced in the radial direction from the inner circumferential surface of the blind hole.

12. The solenoid valve according to claim 11, wherein on its valve seat-side face side, the valve armature includes a radial collar against which a compression spring rests that biases the valve armature to an initial state.

13. The solenoid valve according to claim 11, in an axial view, the valve seat is located radially within a cross-section defined by the projection.

14. The method according to claim 6, wherein the elastomer material is filled into the blind hole up to axially behind an undercut.

* * * * *